US012228277B2

(12) United States Patent
Liao et al.

(10) Patent No.: US 12,228,277 B2
(45) Date of Patent: Feb. 18, 2025

(54) LIGHT SOURCE MODULE

(71) Applicant: CHAMP VISION DISPLAY INC., Miao-Li County (TW)

(72) Inventors: Chun-Chien Liao, Miao-Li County (TW); Hsin-Hung Lee, Miao-Li County (TW); Chung-Hao Wu, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 0 days.

(21) Appl. No.: 18/620,987

(22) Filed: Mar. 28, 2024

(65) Prior Publication Data

US 2024/0392945 A1 Nov. 28, 2024

(30) Foreign Application Priority Data

May 22, 2023 (TW) ................................ 112118894

(51) Int. Cl.
*F21V 7/05* (2006.01)
*F21K 9/27* (2016.01)
*F21S 4/28* (2016.01)
*F21V 7/00* (2006.01)

(52) U.S. Cl.
CPC .................. *F21V 7/05* (2013.01); *F21K 9/27* (2016.08); *F21V 7/005* (2013.01); *F21S 4/28* (2016.01)

(58) Field of Classification Search
CPC ............. F21V 7/05; F21V 7/041; F21V 7/005
USPC ............................................. 362/241, 217.05
See application file for complete search history.

(56) References Cited

U.S. PATENT DOCUMENTS

| | | | | |
|---|---|---|---|---|
| 8,197,105 B2 * | 6/2012 | Yang | ........................ | F21S 8/033 362/217.05 |
| 2012/0182713 A1 * | 7/2012 | Bretschneider | ........... | F21S 4/28 362/217.01 |
| 2015/0300590 A1 | 10/2015 | Huang | | |

FOREIGN PATENT DOCUMENTS

| | | |
|---|---|---|
| CN | 203784727 | 8/2014 |
| CN | 109519771 | 3/2019 |
| CN | 212456505 | 2/2021 |
| CN | 115095803 A * | 9/2022 |
| CN | 217598438 | 10/2022 |
| TW | M436135 | 8/2012 |
| TW | I610045 | 1/2018 |
| TW | 202232027 | 8/2022 |
| TW | I785817 | 12/2022 |

OTHER PUBLICATIONS

"Office Action of Taiwan Counterpart Application", issued on Aug. 30, 2024, p. 1-p. 7.

* cited by examiner

*Primary Examiner* — Laura K Tso
(74) *Attorney, Agent, or Firm* — JCIPRNET

(57) ABSTRACT

A light source module includes a light source and a reflective element. The light source has a light emitting surface. The reflective element is disposed on a transmission path of an illumination light beam emitted from the light source. The illumination light beam reflected by the reflective element is irradiated on a target plane. The reflective element includes a first reflective surface and a second reflective surface. The first reflective surface is disposed towards the light emitting surface of the light source, and is a plane. The second reflective surface bendably extends from the first reflective surface.

6 Claims, 7 Drawing Sheets

LIGHT SOURCE MODULE

CROSS-REFERENCE TO RELATED APPLICATION

This application claims the priority benefit of Taiwan application serial no. 112118894, filed on May 22, 2023. The entirety of the above-mentioned patent application is hereby incorporated by reference herein and made a part of this specification.

BACKGROUND

Technical Field

The disclosure relates to a lighting technology, and more particularly, to a light source module.

Description of Related Art

In recent years, a screen hanging lamp with an asymmetric optical design has gradually gained market acceptance because it may avoid discomfort caused by direct light shining on a screen, eye soreness after long-term use, and so on. The current method of adjusting an illumination light distribution pattern of the screen hanging lamp may be divided into two categories, one of which is to use a lens to perform light converging or light dimming, and the other is to use a reflective lampshade to reflect an illumination light beam and reshape a light distribution pattern thereof. However, there is no design scheme that may take into account the overall illuminance and illuminance uniformity within an illumination range for the current screen hanging lamp that use the reflective lampshade.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

In order to achieve one, a part, or all of the above objectives or other objectives, an embodiment of the disclosure provides a light source module. The light source module includes a light source and a reflective element. The light source has a light emitting surface. The reflective element is disposed on a transmission path of an illumination light beam emitted from the light source. The illumination light beam reflected by the reflective element is irradiated on a target plane. The reflective element includes a first reflective surface and a second reflective surface. The first reflective surface is disposed towards the light emitting surface of the light source, and is a plane. The second reflective surface bendably extends from the first reflective surface.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
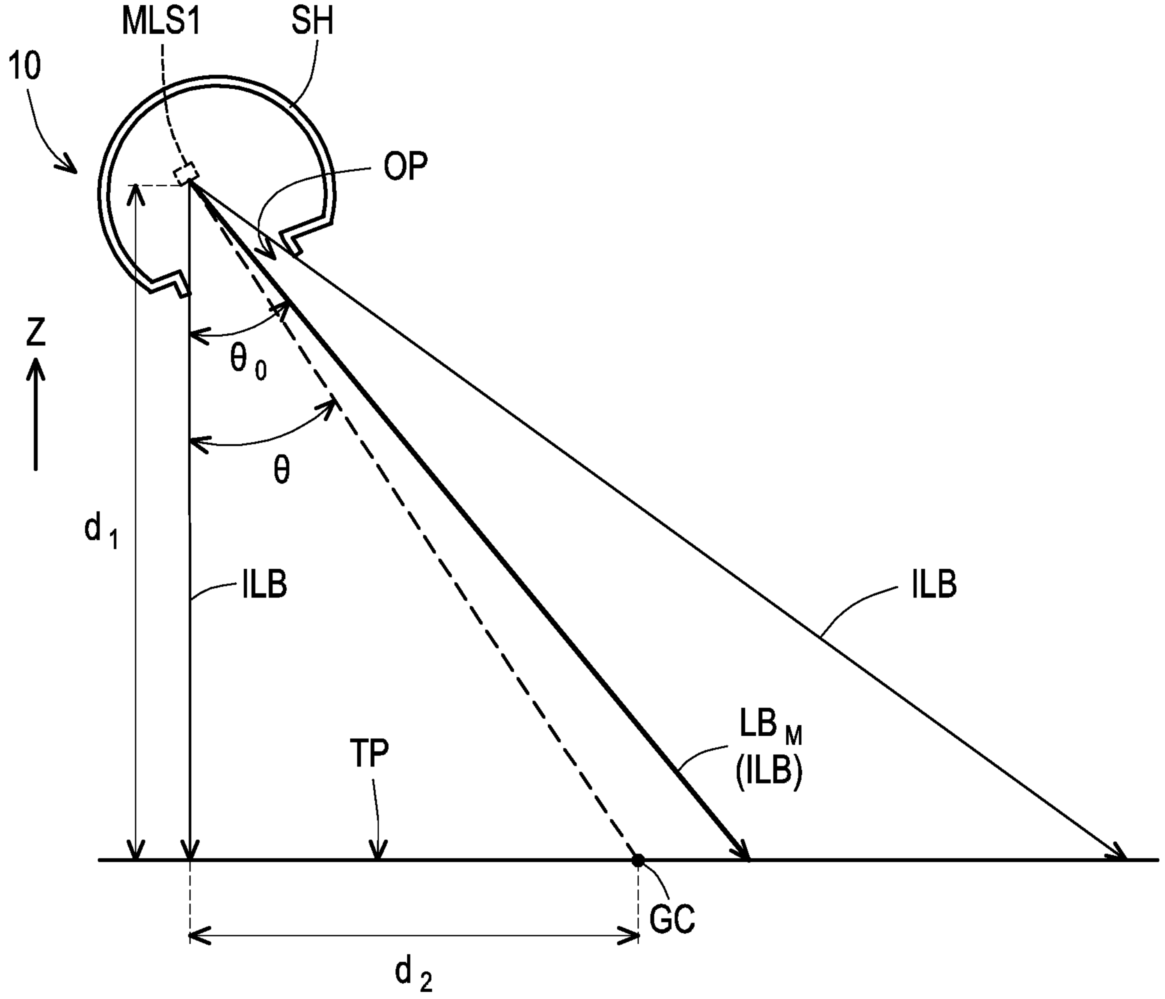
FIG. 1 is a schematic cross-sectional view of a light source module according to the disclosure.
Figure 2A:
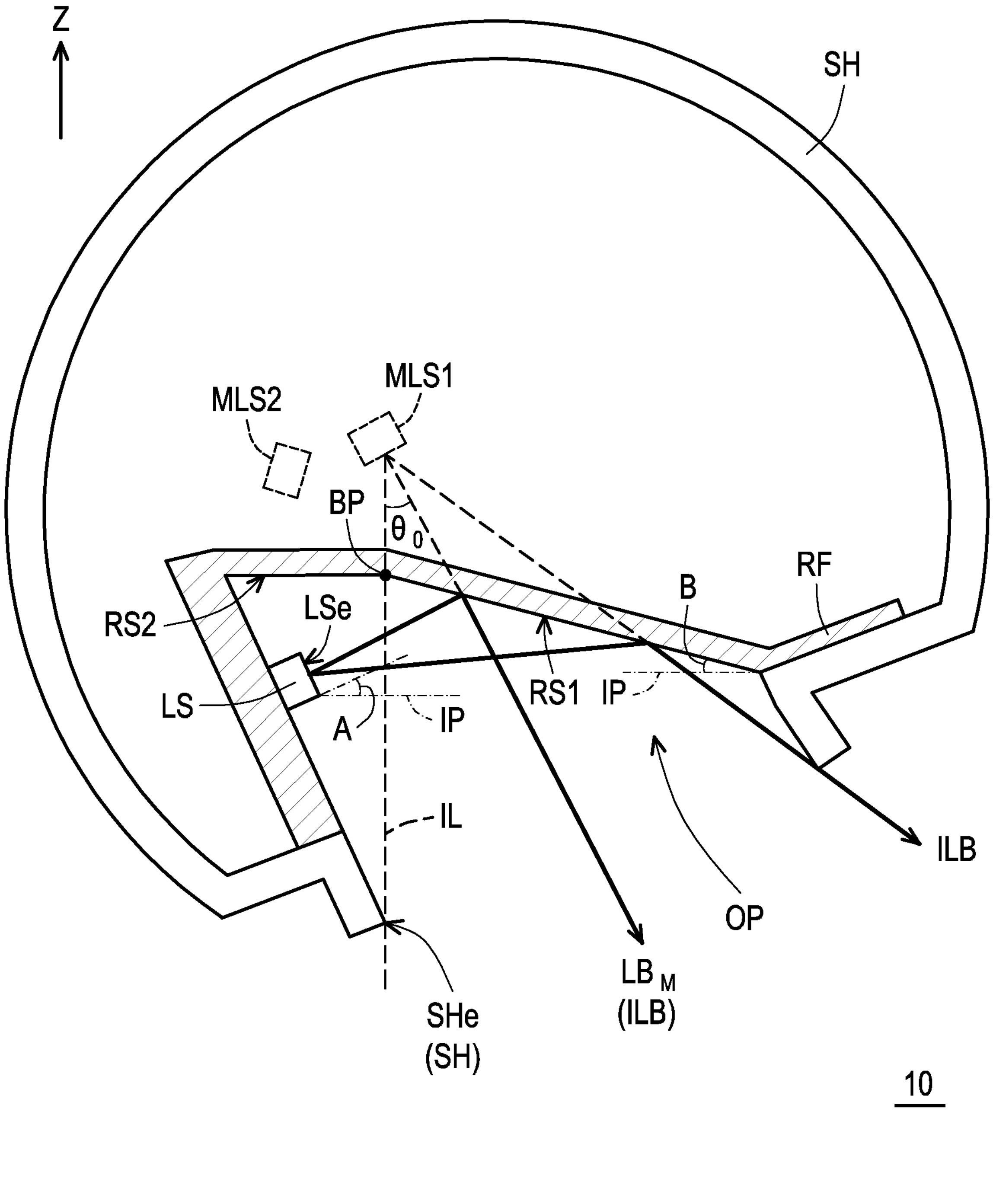
FIGS. 2A and 2B are schematic enlarged views of the light source module in FIG. 1.
Figure 2B:
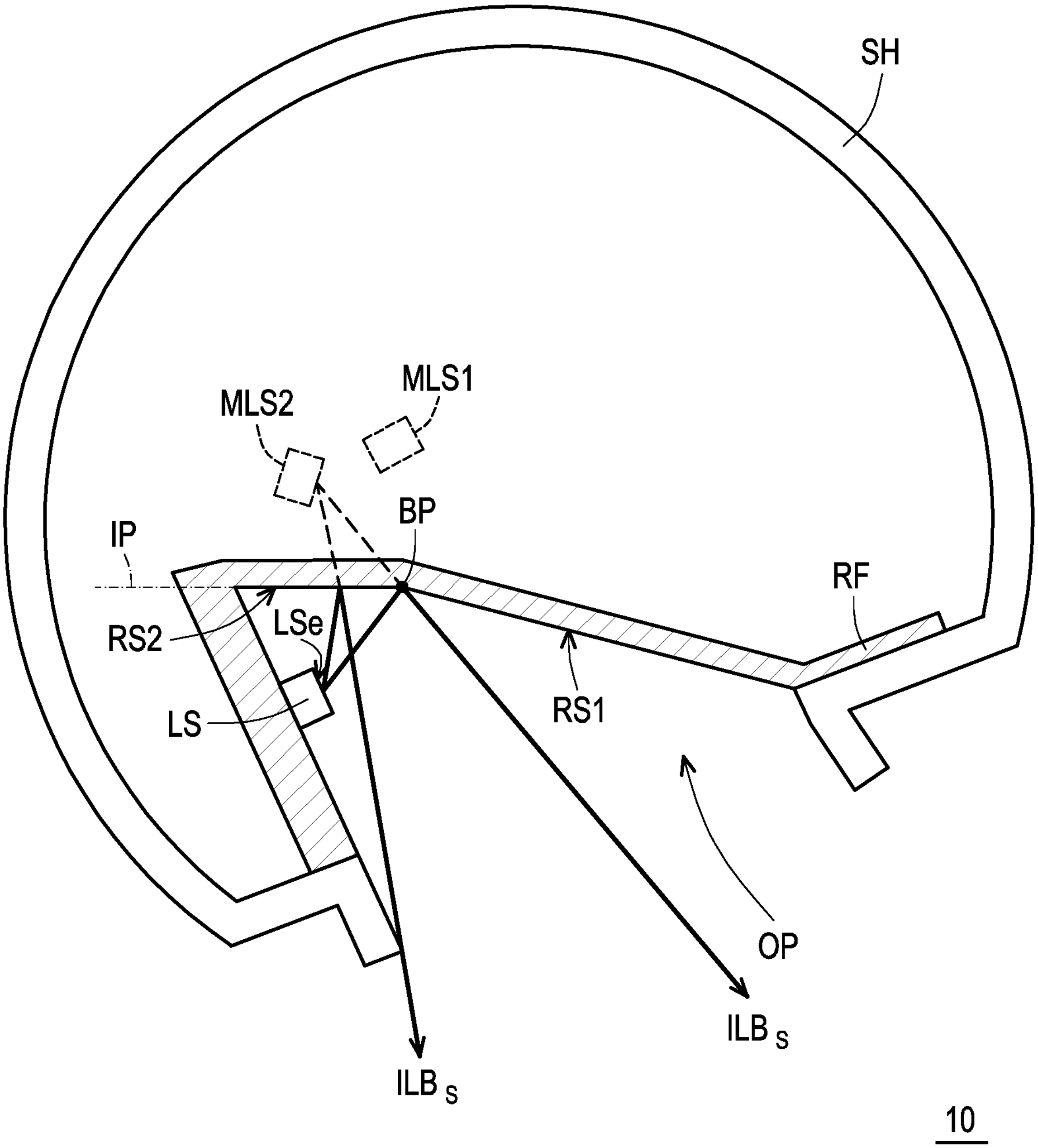
Figure 3:
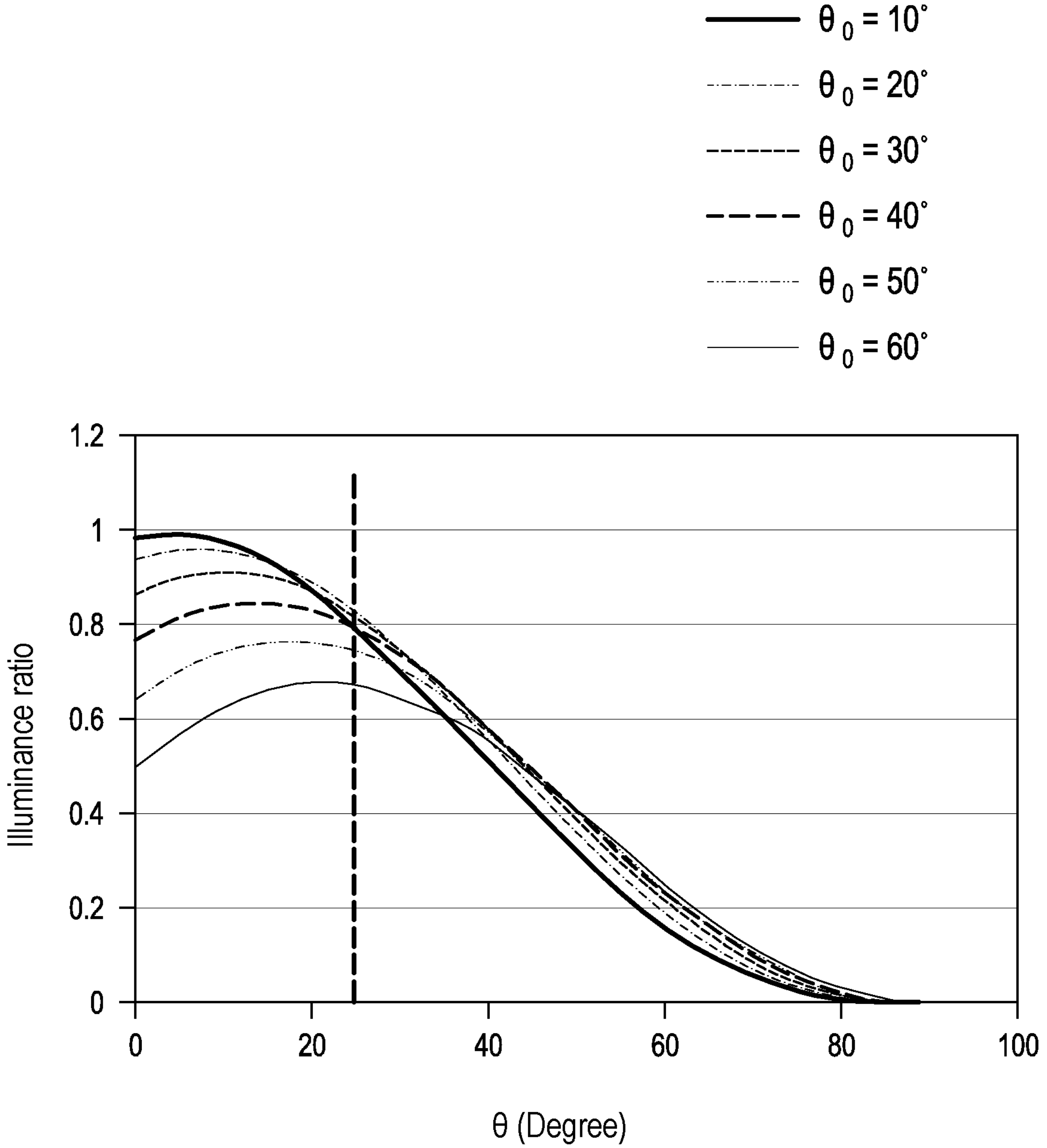
FIG. 3 is a distribution curve of illuminance ratio of the light source module in FIG. 1 on a target plane to different included angles $\theta$ under different included angles $\theta_0$.
Figure 4:
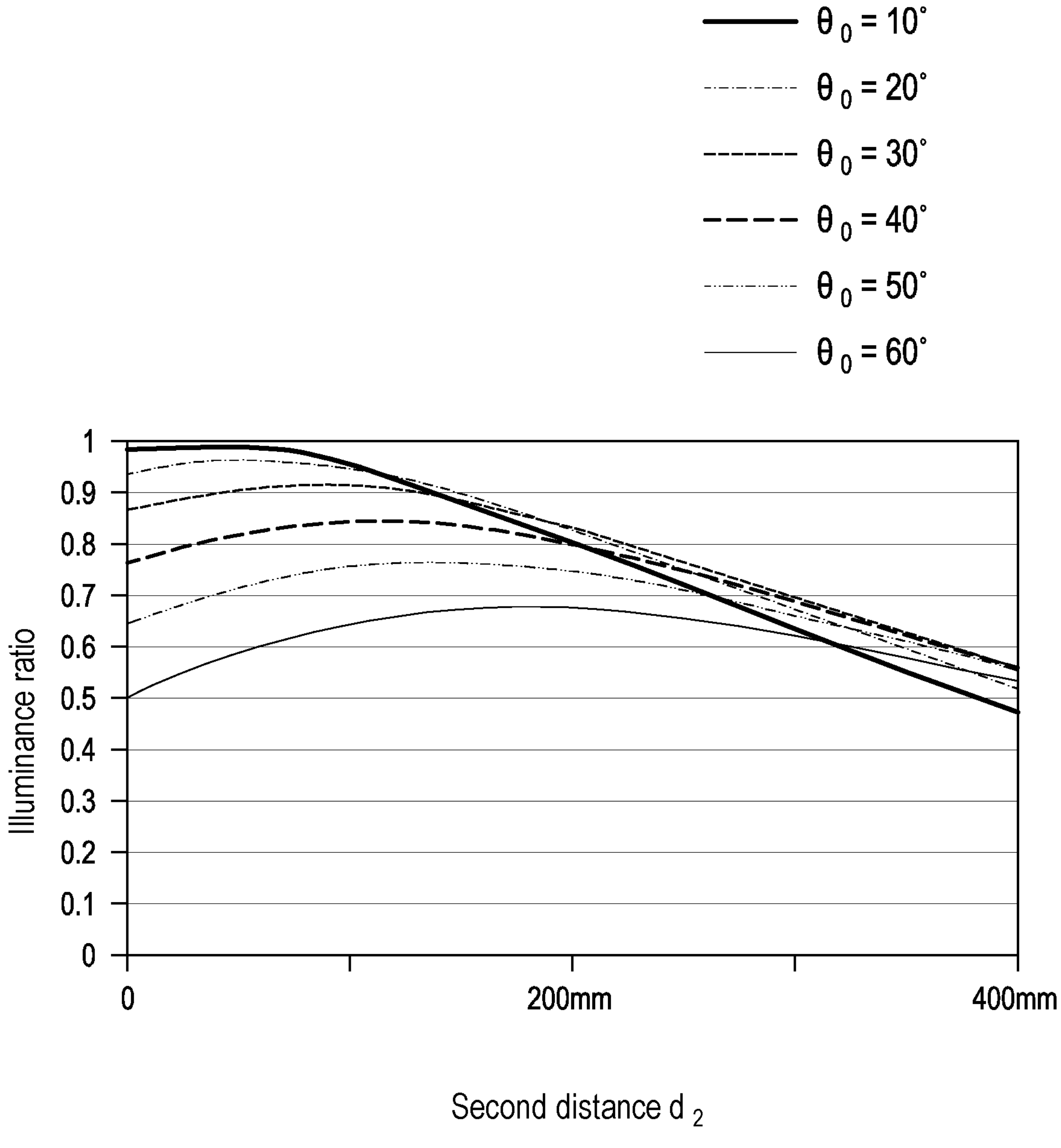
FIG. 4 is a distribution curve of illuminance ratio of the light source module in FIG. 1 on a target plane to different irradiation positions under different included angles $\theta_0$.
Figure 5:
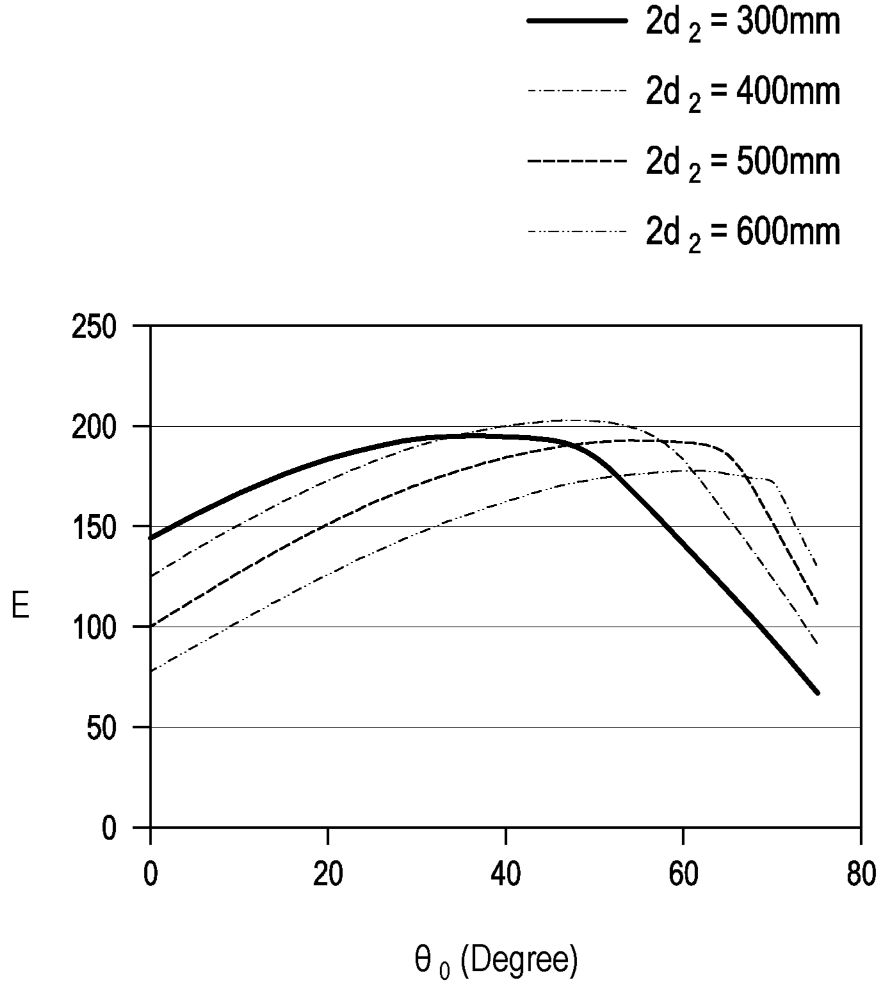
FIG. 5 is a distribution curve of an evaluation value E of the light source module in FIG. 1 to different included angle $\theta_0$ under different lengths of a target plane.

FIG. 1 is a schematic cross-sectional view of a light source module according to the disclosure. FIGS. 2A and 2B are schematic enlarged views of the light source module in FIG. 1. FIG. 3 is a distribution curve of illuminance ratio of the light source module in FIG. 1 on a target plane to different included angles θ under different included angles $\theta_0$. FIG. 4 is a distribution curve of illuminance ratio of the light source module in FIG. 1 on a target plane to different irradiation positions under a condition of different included angles $\theta_0$. FIG. 5 is a distribution curve of an evaluation value E of the light source module in FIG. 1 to different included angle $\theta_0$ under different lengths of a target plane.

Referring to FIGS. 1 and 2A, a light source module 10 includes a light source LS and a reflective element RF. The light source LS has a light emitting surface LSe, and is adapted to emit an illumination light beam ILB through the light emitting surface LSe. The reflective element RF is disposed on a transmission path of the illumination light beam ILB from the light source LS. The light source module 10 is adapted to provide illumination to a target plane TP. Specifically, the illumination light beam ILB from the light source LS reflected by the reflective element RF is irradiated on the target plane TP.

In this embodiment, the light source module 10 may further include a shell SH, and the light source LS and the reflective element RF are disposed in the shell SH. The shell SH is provided with an opening OP. The illumination light beam ILB is irradiated on the target plane TP through the opening OP of shell SH. More specifically, the light source module 10 in this embodiment may be a lamp used as a screen hanging lamp, but the disclosure is not limited thereto.

Furthermore, the light emitting surface LSe of the light source LS is inclined away from the target plane TP. For example, there is an included angle A greater than 0 between a normal direction of the light emitting surface LSe of the light source LS and a virtual plane IP. The virtual plane IP (as shown in FIG. 2A) is parallel to the target plane TP in FIG. 1. Preferably, the included angle A may range from 10 degrees to 30 degrees.

The reflective element RF includes a first reflective surface RS1 and a second reflective surface RS2. The first reflective surface RS1 is disposed towards the light emitting surface LSe of the light source LS. The second reflective surface RS2 bendably extends from the first reflective surface RS1. It should be particularly noted that both the first reflective surface RS1 and the second reflective surface RS2 of the reflective element RF are planes. The light source module 10 has a first mirror light source MLS1 mirrored with the light source LS relative to the first reflective surface RS1. That is, the first mirror light source MLS1 is located on a side of the reflective element RF away from the light source LS and the first reflective surface RS1.

From another point of view, the illumination light beam ILB emitted from the light source LS is reflected by the first reflective surface RS1 of the reflective element RF. If a light path of the illumination light beam ILB reflected by the first reflective surface RS1 of the reflective element RF extends in a direction opposite to a travelling direction of light, the light path will intersect at the first mirror light source MLS1. That is to say, the illumination light beam ILB may also be regarded as a light beam emitted from the first mirror light source MLS1 without changing a direction of an optical path through any reflective element or refractive element (as shown in FIGS. 1 and 2A).

It should be noted that in this embodiment, the shell SH has an edge SHe that defines the opening OP and is closer to the light source LS, and a virtual connecting line IL connected between the first mirror light source MLS1 and the edge SHe of the shell SH passes through a bend BP of the reflective element RF between the first reflective surface RS1 and the second reflective surface RS2. Since the light from the first mirror light source MLS1 exceeding the virtual connecting line IL will be shielded by the shell SH, it is chosen here to turn from the first reflective surface RS1 to the second reflective surface RS2 to achieve the best illumination efficiency of the lamp. In this embodiment, the virtual connecting line IL is parallel to a normal direction (for example, a direction Z) of the target plane TP.

In this embodiment, in the illumination light beam ILB emitted from the light source LS, a main light beam LBM (for example, a part with the highest light energy in a light emitting light pattern) emitted perpendicular to the light emitting surface LSe has an included angle $\theta_0$ between the light path of the main light beam LBM after being reflected by the first reflective surface RS1 and the normal direction (for example, the direction Z) of the target plane TP. There is an included angle B greater than 0 between the first reflective surface RS1 and the virtual plane IP (parallel to the target plane TP).

According to the included angle $\theta_0$ required between the light path of the main light beam LBM and the normal direction of the target plane TP and the included angle A between the normal direction of the light emitting surface LSe of the light source LS and the virtual plane IP, the following relational expression (1) may be used to calculate the included angle B between the first reflective surface RS1 of the reflective element RF and the virtual plane IP.

$$B = 45° - (A + \theta_0)/2 \qquad \text{Relational expression (1)}$$

Referring to FIG. 1, in this embodiment, there is a first distance $d_1$ between the first mirror light source MLS1 and the target plane TP along the normal direction of the target plane TP, and there is a second distance $d_2$ between a position of any point (for example, a geometric center GC of an irradiation area of the light source module 10 on the target plane TP) in the irradiation area (for example, a range from a position of the leftmost illumination light beam ILB on the target plane TP to a position of the rightmost illumination light beam ILB on the target plane TP in FIG. 1) of the light source module 10 on the target plane TP and an orthographic projection of the first mirror light source MLS1 on the target plane TP. Therefore, an included angle θ between a virtual connecting line connected with the position of any point in the irradiation area on the target plane TP and the first mirror light source MLS1 and the normal direction of the target plane TP should be equal to $\tan^{-1}(d_2/d_1)$.

More specifically, here, the position of any point in the irradiation area on the target plane TP relative to the first mirror light source MLS1 is defined by the included angle θ. For example, when the first distance $d_1$ is 450 mm, and a length of the irradiation area on the target plane TP is 400 mm, the included angle θ corresponding to the geometric center GC of the irradiation area on the target plane TP (that is, the second distance $d_2$ is 200 mm) is about 24 degrees.

According to the above definition of the included angle θ and the included angle $\theta_0$, an illuminance ratio LR received at the position of any point in the irradiation area on the target plane TP may be represented by the following relational expression (2).

$$LR = \cos(\theta_0 - \theta) \cdot \cos^2(\theta) \qquad \text{Relational expression (2)}$$

According to the relational expression (2), a distribution curve of the illuminance ratio at the position of any point in the irradiation area on the target plane TP under a condition of different included angles $\theta_0$ to the included angle θ may be drawn, as shown in FIG. 3. For example, if a maximum illuminance ratio is set at the geometric center GC of the irradiation area on the target plane TP (that is, a position where the included angle θ is 24 degrees, as shown in a dashed line in FIG. 3), the included angle θ corresponding to the maximum illuminance ratio of the distribution curve with an included angle $\theta_0$ of 60 degrees is closest to 24 degrees.

From another point of view, in order to enable the position corresponding to the specific included angle θ in the irradiation area on the target plane TP to have the maximum illuminance ratio, an optimal design value of the included angle $\theta_0$ may be obtained by the following relational expression (3).

$$\theta_0=\tan^{-1}\left[3\sin(\theta)\cos(\theta)/\left(\cos^2(\theta)-2\sin^2(\theta)\right)\right] \quad \text{Relational expression (3)}$$

Therefore, if the maximum illuminance ratio is set at the geometric center GC of the irradiation area on the target plane TP, the optimal design value of the included angle $\theta_0$ is 65.5 degrees. Then according to the aforementioned relational expression (1), a design value of the included angle B required between the first reflective surface RS1 of the reflective element RF and the target plane TP may be obtained.

According to FIG. 3, although the design value of the included angle B obtained when the included angle $\theta_0$ is 60 degrees may have the maximum illuminance ratio at the geometric center GC of the irradiation area on the target plane TP, the overall illuminance ratio of the irradiation area on the target plane TP is the lowest among all the curves in FIG. 3. In order to take into account the overall illuminance of the irradiation area of the target plane TP, a sum of the illuminance ratios received at the position of each point in the irradiation area on the target plane TP is required to be considered at the same time.

For the convenience of illustration, the included angles θ corresponding to different positions in the irradiation area on the target plane TP in FIG. 3 may be converted into the second distance $d_2$ through a conversion formula of $d_2$–$d_1$·tan (0), as shown in FIG. 4. Therefore, an area between any curve of the illuminance ratio and a horizontal axis in FIG. 4 is a total illuminance ratio TLR received at the irradiation area of the target plane TP under the condition of the corresponding included angle $\theta_0$. As shown in Table 1 below, when the included angle $\theta_0$ is 20 degrees, the total illuminance ratio TLR received at the irradiation area of the target plane TP is the largest.

TABLE 1

| θ0 (degree) | 10 | 20 | 30 | 40 | 50 | 60 |
|---|---|---|---|---|---|---|
| TLR | 314.89 | 320.54 | 316.45 | 302.74 | 279.84 | 248.43 |
| U % | 0.48 | 0.54 | 0.60 | 0.66 | 0.72 | 0.74 |
| E | 151.30 | 173.39 | 189.98 | 199.77 | 201.61 | 183.35 |

In order to take into account an overall illuminance uniformity of the irradiation area on the target plane TP, a ratio (i.e., an illuminance uniformity U %) of a minimum illuminance ratio to a maximum illuminance ratio of any curve of the illuminance ratio in FIG. 4 may also be used as one of evaluation parameters. The greater the illuminance uniformity U %, the better. As shown in Table 1, when the included angle $\theta_0$ is 60 degrees, the illuminance uniformity U % of the irradiation area on the target plane TP is the best.

Table 1 further shows the evaluation value E of both the overall illuminance and the illuminance uniformity of the irradiation area on the target plane TP under the condition of different included angle $\theta_0$. The evaluation value E is a product value of the total illuminance ratio TLR and the illuminance uniformity U %. In addition, the greater the evaluation value E, the better.

According to Table 1, when the included angle $\theta_0$ is in a range of 40 degrees to 50 degrees, both the overall illuminance and the illuminance uniformity of the irradiation area on the target plane TP may be considered. If the included angle $\theta_0$ is in a range of 30 degrees to 40 degrees, some illuminance uniformity is sacrificed in exchange for improvement of the overall illuminance. In contrast, if the included angle $\theta_0$ is in a range of 50 degrees to 60 degrees, some overall illuminance is sacrificed in exchange for improvement of the illuminance uniformity.

On the other hand, if the first distance $d_1$ between the first mirror light source MLS1 and the target plane TP in FIG. 1 is fixed, the evaluation value E may be used to determine an optimal value of the included angle $\theta_0$ under the length (i.e. twice the value of the second distance $d_2$ in FIG. 1) of the irradiation area of different target planes TP. The four curves in FIG. 5 are the distribution of the evaluation value E of the light source module to the included angle $\theta_0$ when the first distance $d_1$ is fixed at 450 mm, and the length of the irradiation area of the target plane TP is 300 mm, 400 mm, 500 mm, and 600 mm respectively. According to FIG. 5, for the length of the irradiation area of different target planes TP, the included angle $\theta_0$ corresponding to the maximum evaluation value E may be selected as the optimal design value.

Referring to FIGS. 1 and 2B, on the other hand, the second reflective surface RS2 of the reflective element RF does not overlap the light emitting surface LSe along the normal direction of the light emitting surface LSe of the light source LS. Therefore, through a design of the second reflective surface RS2, an illumination light beam ILBs emitted from the light source LS at a large angle may be reflected in a specific area of the irradiation area of the target plane TP to further improve the overall illuminance and the illuminance uniformity within an illumination range. In this embodiment, the second reflective surface RS2 may be selectively parallel to the virtual plane IP and the target plane TP. That is, the included angle between the second reflective surface RS2 and the target plane TP is 0.

The light source module 10 further includes a second mirror light source MLS2 mirrored with the light source LS relative to the second reflective surface RS2. That is, the second mirror light source MLS2 is located on a side of the reflective element RF away from the light source LS the second reflective surface RS2. From another point of view, the illumination light beam ILBs emitted from the light source LS at the large angle is reflected by the second reflective surface RS2 of the reflective element RF. If a light path of the illumination light beam ILB reflected by the second reflective surface RS2 of the reflective element RF extends in a direction opposite to a travelling direction of the light after reflected by the second reflective surface RS2 of the reflective element RF, the light path will intersect at the second mirror light source MLS2. That is to say, the illumination light beam ILBs may also be regarded as a light beam emitted from the second mirror light source MLS2 without changing the direction of the optical path through any reflective element or refractive element (as shown in FIG. 2B).

Some other embodiments are provided below to describe the invention in detail, where the same reference numerals denote the same or like components, and descriptions of the same technical contents are omitted. The aforementioned embodiment may be referred for descriptions of the omitted parts, and detailed descriptions thereof are not repeated in the following embodiment.

Figure 6:
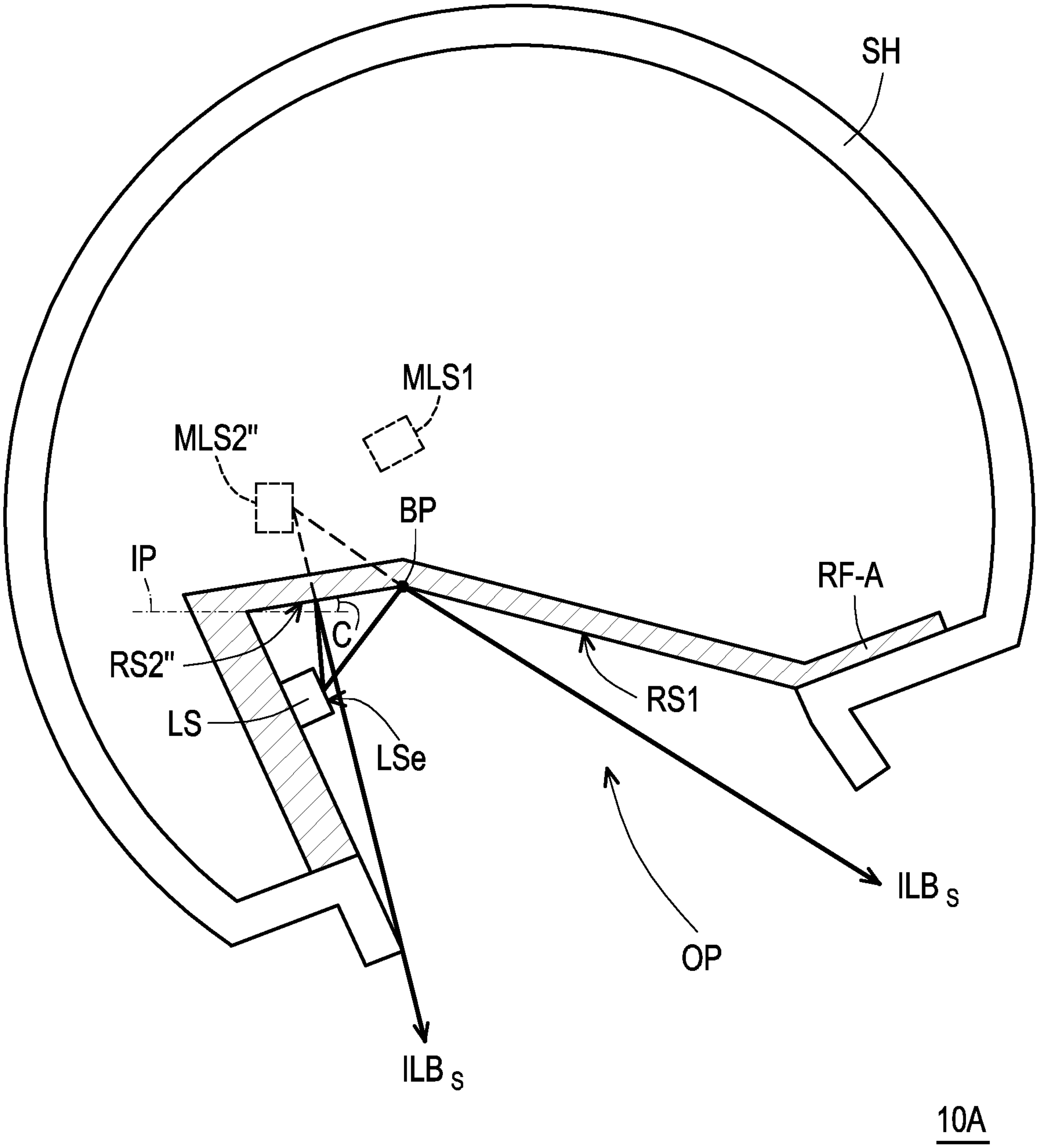
FIG. 6 is a schematic cross-sectional view of another light source module according to the disclosure.

FIG. 6 is a schematic cross-sectional view of another light source module according to the disclosure. Referring to FIG. 6, a difference between a light source module 10A in this embodiment and the light source module 10 in FIG. 2B lies in that a configuration of the second reflective surface is different. Specifically, in this embodiment, an included angle C between a second reflective surface RS2" of a reflective element RF-A and the virtual plane IP is greater than 0. In particular, the virtual plane IP in FIG. 6 is, for example, parallel to the target plane TP in FIG. 1. That is to say, the second reflective surface RS2" in this embodiment is inclined compared with the target plane TP in FIG. 1.

Therefore, a range of an irradiation area of the illumination light beam ILBs emitted from the light source LS at the large angle on the target plane TP in FIG. 1 after reflected by the second reflective surface RS2" in this embodiment (or in other words, the illumination light beam ILBs emitted from a second mirror light source MLS2" at a large angle) may be further expanded (according to a comparison between FIG. 2B and FIG. 6).

Based on the above, in the light source module according to an embodiment of the disclosure, the reflective element is adapted to reflect the illumination light beam from the light source on the target plane. The first reflective surface of the reflective element disposed towards the light emitting surface of the light source may reflect more illumination light beams and irradiate the illumination light beams on the target plane in a more uniform manner. In addition, the second reflective surface bendably extending from the first reflective surface may further reflect the illumination light beam emitted from the light source at the large angle to the specific area on the target plane to further improve the overall illuminance and the illuminance uniformity within the illumination range.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module adapted to provide illumination to a target plane, wherein the light source module comprises:
- a light source having a light emitting surface;
- a reflective element disposed on a transmission path of an illumination light beam emitted from the light source, wherein the illumination light beam reflected by the reflective element is configured to irradiated on the target plane, and the reflective element comprises:
  - a first reflective surface disposed towards the light emitting surface of the light source and being a plane; and
  - a second reflective surface bendably extending from the first reflective surface; and
- a shell provided with an opening, wherein the light source and the reflective element are disposed in the shell, and the illumination light beam is irradiated on the target plane through the opening of the shell, wherein an included angle B is between the first reflective surface and the target plane, an included angle C is between the second reflective surface and the target plane, the included angle B is greater than the included angle C, and the included angle C is greater than or equal to 0,
- wherein the second reflective surface does not overlap the light emitting surface along a normal direction of the light emitting surface of the light source.

2. A light source module adapted to provide illumination to a target plane, wherein the light source module comprises:
- a light source having a light emitting surface; and
- a reflective element disposed on a transmission path of an illumination light beam emitted from the light source, wherein the illumination light beam reflected by the reflective element is configured to irradiate on the target plane, and the reflective element comprises:
  - a first reflective surface disposed towards the light emitting surface of the light source and being a plane; and
  - a second reflective surface bendably extending from the first reflective surface, wherein an included angle A is between a normal direction of the light emitting surface of the light source and the target plane, an included angle B is between the first reflective surface and the target plane, and in the illumination light beam, a main light beam emitted perpendicular to the light emitting surface of the light source has an included angle $\theta_0$ between a light path of the main light beam after being reflected by the first reflective surface and a normal direction of the target plane, and the light source module satisfies a following relational expression:

$$B=45°-(A+\theta_0)/2.$$

3. The light source module according to claim 2, wherein the included angle A ranges from 10 degrees to 30 degrees.

4. The light source module according to claim 2, further comprising a first mirror light source mirrored with the light source relative to the first reflective surface, wherein a first distance $d_1$ is between the first mirror light source and the target plane along the normal direction of the target plane, and a second distance $d_2$ is between an orthographic projection of the first mirror light source on the target plane and a geometric center of an irradiation area on the target plane, and the light source module satisfies a following relational expression:

$$\theta_0 = \tan^{-1}\left[3\sin(\theta)\cos(\theta)/\left(\cos^2(\theta) - 2\sin^2(\theta)\right)\right],$$

wherein $\theta=\tan^{-1}(d_2/d_1)$.

5. A light source module adapted to provide illumination to a target plane, wherein the light source module comprises:

a light source having a light emitting surface;

a reflective element disposed on a transmission path of an illumination light beam emitted from the light source, wherein the illumination light beam reflected by the reflective element is configured to irradiate on the target plane, and the reflective element comprises:

a first reflective surface disposed towards the light emitting surface of the light source and being a plane; and a second reflective surface bendably extending from the first reflective surface;

a shell provided with an opening, wherein the light source and the reflective element are disposed in the shell, and the illumination light beam is configured to irradiated on the target plane through the opening of the shell; and a first mirror light source mirrored with the light source relative to the first reflective surface, wherein the shell has an edge defining the opening and closer to the light source, and a virtual connecting line connected between the first mirror light source and the edge of the shell passes through a bend of the reflective element between the first reflective surface and the second reflective surface.

6. The light source module according to claim 1, wherein the light emitting surface of the light source is inclined away from the target plane.

* * * * *